United States Patent [19]

Yianilos

[11] Patent Number: 5,153,831
[45] Date of Patent: Oct. 6, 1992

[54] ELECTRONIC TEXT
[75] Inventor: Peter N. Yianilos, Princeton, N.J.
[73] Assignee: Franklin Electronic Publishers, Incorporated, Mt. Holly, N.J.
[21] Appl. No.: 529,868
[22] Filed: May 29, 1990
[51] Int. Cl.[5] .............................................. G06F 15/38
[52] U.S. Cl. ................................................... 364/419
[58] Field of Search ..................... 364/419, 200, 900; 341/106, 55, 51

[56] References Cited

U.S. PATENT DOCUMENTS

| | | | |
|---|---|---|---|
| 4,450,520 | 5/1984 | Hollaar et al. | 364/200 |
| 4,597,057 | 6/1986 | Snow | 364/900 |
| 4,803,651 | 2/1989 | Galkowski | 364/900 |

Primary Examiner—Dale M. Shaw
Assistant Examiner—Xuong Chung
Attorney, Agent, or Firm—McAulay Fisher Nissen Goldberg & Kiel

[57] ABSTRACT

A text is encoded as a file in electronic memory for reading and search purposes. A lexicon-file is established in which each term that can searched is incorporated. A text-file is established in which non-search terms are directly encoded and in which all of the search terms (that is all of the terms in the lexicon-file) are designated by linking numbers. The linking numbers link through each incidence of the lexicon word as a text word and finally link back to the same lexicon word in the lexicon-file and then from the lexicon-file back to the text-file. In this fashion, by using numbers to link through each incidence of a lexicon word in the text-file and the encoded lexicon word in the lexicon-file, the word is encoded in memory only once and all other entries for the word are in terms of linking numbers.

25 Claims, 6 Drawing Sheets

TEXT

PETER PIPER PICKED A PECK OF PICKLED PEPPERS. IF PETER PIPER DID PICK A PECK OF PICKLED PEPPERS, HOW MANY PICKLED PEPPERS WERE PICKED BY PETER PIPER?

FIRST EMBODIMENT:

LEXICON-FILE

| ROW | TERM | TEXT LOCATION | ROW | TERM | TEXT LOCATION | ROW | TERM | TEXT LOCATION |
|---|---|---|---|---|---|---|---|---|
| 1. | A | 4 | 7. | PICKLED | 7 | 13. | , | 20 |
| 2. | IF | 10 | 8. | PICKED | 3 | 14. | ? | 30 |
| 3. | OF | 17 | 9. | WERE | 25 | 15. | HOW | 21 |
| 4. | PECK | 5 | 10. | BY | 27 | 16. | MANY | 22 |
| 5. | PETER | 1 | 11. | PIPER | 2 | 17. | DID | 13 |
| 6. | PEPPERS | 8 | 12. | . | 9 | 18. | PICK | 14 |

(THIRD TYPE OF LINKING SIGNAL)

TEXT-FILE (SECOND TYPE OF LINKING SIGNAL)

10  10  23  11  11  11  11  11  -12  -2
17  17  -17  -18  -1  -4  -3  5  5  -13
-15  -16  -7  -6  -9  -8  -10  -5  -11  -14

(FIRST TYPE OF LINKING SIGNAL)

FIG.2

SECOND EMBODIMENT (SAME TEXT AS FIRST EMBODIMENT)

LEXICON-FILE

| ROW | TERM | TEXT LOCATION | ROW | TERM | TEXT LOCATION | ROW | TERM | TEXT LOCATION |
|---|---|---|---|---|---|---|---|---|
| 1. | PECK | 5 | 4. | PICKLED | 7 | 7. | PICK | 14 |
| 2. | PETER | 1 | 5. | PICKED | 3 | | | |
| 3. | PEPPERS | 8 | 6. | PIPER | 2 | | | |

TEXT-FILE 10 10 23 A 11 OF 11 11 . IF
17 17 DID -7 A -1 OF 5 5 ,
HOW MANY -4 -3 WERE -5 BY -2 -6 ?

FIG.3

THIRD EMBODIMENT (SAME TEXT AS FIRST EMBODIMENT)

LEXICON-FILE

| ROW | TERM | TEXT LOCATION | ROW | TERM | TEXT LOCATION | ROW | TERM | TEXT LOCATION |
|---|---|---|---|---|---|---|---|---|
| 1. | PECK | 4 | 4. | PICKLED | 5 | 7. | PICK | 9 |
| 2. | PETER | 1 | 5. | PICKED | 3 | | | |
| 3. | PEPPERS | 6 | 6. | PIPER | 2 | | | |

TEXT-FILE

SEARCH-SUBFILE

```
 7   7  12   6   6   6
 9   9  -7  -1   2   2
-4  -3  -5  -2  -6
```

MASTER-SUBFILE

\* \* \* A \* OF \* \* . IF

\* \* DID \* A \* OF \* \* ,

HOW MANY \* \* WERE \* BY \* \* ?

FIG.4

ELECTRONIC TEXT

CROSS REFERENCE TO RELATED APPLICATION

Reference is made to the application entitled "User Interface For Electronic Text Ser. No. 529,867" by the same inventor filed simultaneously herewith. The contents of that application are incorporated herein by reference.

MICROFICHE APPENDIX

A microfiche Appendix A consisting of six microfiche and 311 frames is available in the file of this case.

BACKGROUND OF THE INVENTION

This invention relates in general to a technique for storing a text in electronic memory and to the associated techniques for reading and searching that memory.

More particularly, this invention relates to a technique for storing a text in electronic memory in a fashion that provides significant compression so that less memory is involved and which also permits searching as well as reading of the text.

There are many storage compression techniques known in the art and used by those skilled in the art to store text material in electronic memory. Many texts, for example the Bible, are useful only if the electronic storage device provides electronic search capabilities. For example, one may want to find all instances of the use of a particular word or phrase or instances where two or more words are used close to one another. In general, search techniques to achieve such results are also well known in the art.

To provide a substantial text such as the Bible in a convenient hand-held format, extensive compression techniques are required. A highly extensive compression technique serves the purpose of providing a smaller product, and a less expensive product.

Accordingly, the major purpose of this invention is to provide an enhanced compression technique for a text which is adapted to be used in both a reading mode and a search mode.

Prior art techniques of text storage which provides reading and search capability require two substantial files which are essentially redundant. There is one large file for the text and a second large file which serves to index the text. And, of course, there are all sorts of auxiliary files much less extensive than the two large files that are necessary to provide both reading and searching capability.

Accordingly, a more particular purpose of this invention is to provide a text storage technique which reduces the redundancy in the prior art techniques while providing both a reading mode and a fast search mode.

Definitions

Certain terms are used in the specification and claims in a manner that is in substantial conformance with their usage in the art. However, it might aid in understanding and reduce ambiguity for the following definitions of these terms to be kept in mind and to recognize that these terms are used herein in accordance with the following meanings.

Text

The term "text" refers to the sequence of words and symbols that one would normally call the text of a book.

Since this invention involves encoding not only certain words and symbols that are in the text but also encoding numbers which stand for certain text words, it is important to keep in mind the distinction between the text and the text-file defined below. The word "term" is also used herein to refer collectively to words, punctuation marks and other text symbols.

Text Words

The term "text words" refers to the words and symbols of the text. These symbols are primarily punctuation marks. Each incidence in the text of a word is a separate text word. For example, there may be two dozen incidences of the term "meek" in the Bible. Each such incidence is a separate text word.

Search Word

The term "search word" refers to those words which can be searched in the text. Prepositions, conjunctions, common verbs and other words that are extremely common are not search words.

Lexicon Word

The term "lexicon word" refers to a search word. For example, the word "meek" is a search word. It may constitute two dozen text words. But it only constitutes a single lexicon word. In general terms, non-search words such as "was" are not lexicon words. Non-lexicon words are not subject to being searched and thus are not put in the lexicon-file defined below. Thus they will not be deemed lexicon words for purposes of the disclosure and claims in this case unless specifically otherwise indicated.

Text-File

The term "text-file" refers to the file in memory of the text. The text-file has a separate entry for each text word. The words that are not capable of being searched and thus are non-lexicon words are directly encoded into the text-file. Words that can be searched; namely, each lexicon word, are represented by a text-file entry which is a number. The number indicates another position either in the text-file or in the lexicon-file where an entry standing for the lexicon word or the lexicon word can be found.

Lexicon-File

The "lexicon-file" is that file in memory into which each lexicon word is directly encoded. Since "meek" is a lexicon word, it is directly encoded in the lexicon-file. However, each text occurrence of "meek" will be represented in the text file by a number which will link that text-file occurrence of the word to some other text-file occurrence of the word or to the lexicon-file entry for the word "meek".

Entry

The term "entry" is used in its usual sense to refer to an entry in either the text-file or the lexicon-file. It should be understood herein that the entry in the text-file for those text words that can be searched (that is for the lexicon words) is not the encoding of the word.

BRIEF DESCRIPTION

In brief, one embodiment of this invention is an electronic text in which a text-file constitutes a representation of the text by means of encoded words and encoded numerals. A numeral represents each lexicon word in the text. The numeral in the text-file which represents a word in the text is the number of words that one has to advance in the text to locate the next text word that is the same lexicon word. In this fashion, any given lexicon word is linked throughout the text to all representations of that lexicon word.

There is a lexicon-file for the lexicon words. This file includes a linking signal to indicate the text-file position of the first incidence of each lexicon word. The last incidence of the lexicon word in the text-file is represented by a linking signal which points to or selects the row in the lexicon-file of the associated lexicon word.

In the reading mode, the electronic text starts at the text-file location the user has selected and reads a given word. But the word being read is just a numeral indicating how much further forward in the text the device has to go to find the next incidence of that word. This numeral is one of the linking signals referred to herein. The device then has to link through all of the incidences of the word in the text until it comes to the last incidence of the word. The last incidence then refers the device to the lexicon-file that indicates what word is being read. The device then reads and displays that word. The device then goes on to look at the very next word in the text-file which again may be a numeral that is part of a linking list of numerals that ends up referring the device back to the lexicon-file so that the word itself can be read and displayed. This whole procedure goes on from word to word as long as the device is being employed for reading text. Any word that is very common such as the conjunctions "and", "or" etc. may be directly encoded in the text-file and directly read out without this linking procedure.

The device can track through the linked words with sufficient speed so that it can place each successive word up for display faster than any user's reading speed. Thus, this complex mode of reading is justified because it provides the technique for substantially reducing the amount of text that has to be stored yet can display text at a rate far faster than the user's reading rate.

In the search mode, the user enters a lexicon word which is searched through the lexicon-file to provide the text-file location where that lexicon word first occurs. The device then locates the first incidence of that lexicon word in the text-file and then links through all of the incidences of that lexicon word in the text-file until it comes to the last incidence of the word. The location for each incidence of the word is displayed on the screen so that the user can select each incidence and review the text corresponding to that location of the lexicon word.

In briefest terms, therefore, what this invention provides is a single large data structure (namely the text-file) which allows both convenient readout and fast search.

BRIEF DESCRIPTION OF THE FIGURES

FIG. 2 exemplifies the basic technique of this invention in which each of the words in the text is encoded in the text-file through the lexicon-file.

FIG. 3 is a representation of an alternate embodiment in which only the significant search words of the text involved are encoded in the text-file through the lexicon-file. The nonsearch words are directly encoded in the text-file.

FIG. 4 is another alternate embodiment of the invention in which the text-file is divided into two files to represent the text. A search-file involves only the search words of the invention and those search words are the only ones in the lexicon-file. A master-file encodes a place holder for each of the lexicon/search words and also directly encodes, in the same sequence as in the text, all of the miscellaneous terms, punctuation marks and symbols which complete the text and which are not search words.

DESCRIPTION OF THE PREFERRED EMBODIMENTS

One embodiment of this invention which has been built and used incorporates a King James version of the Holy Bible.

Figure 1:
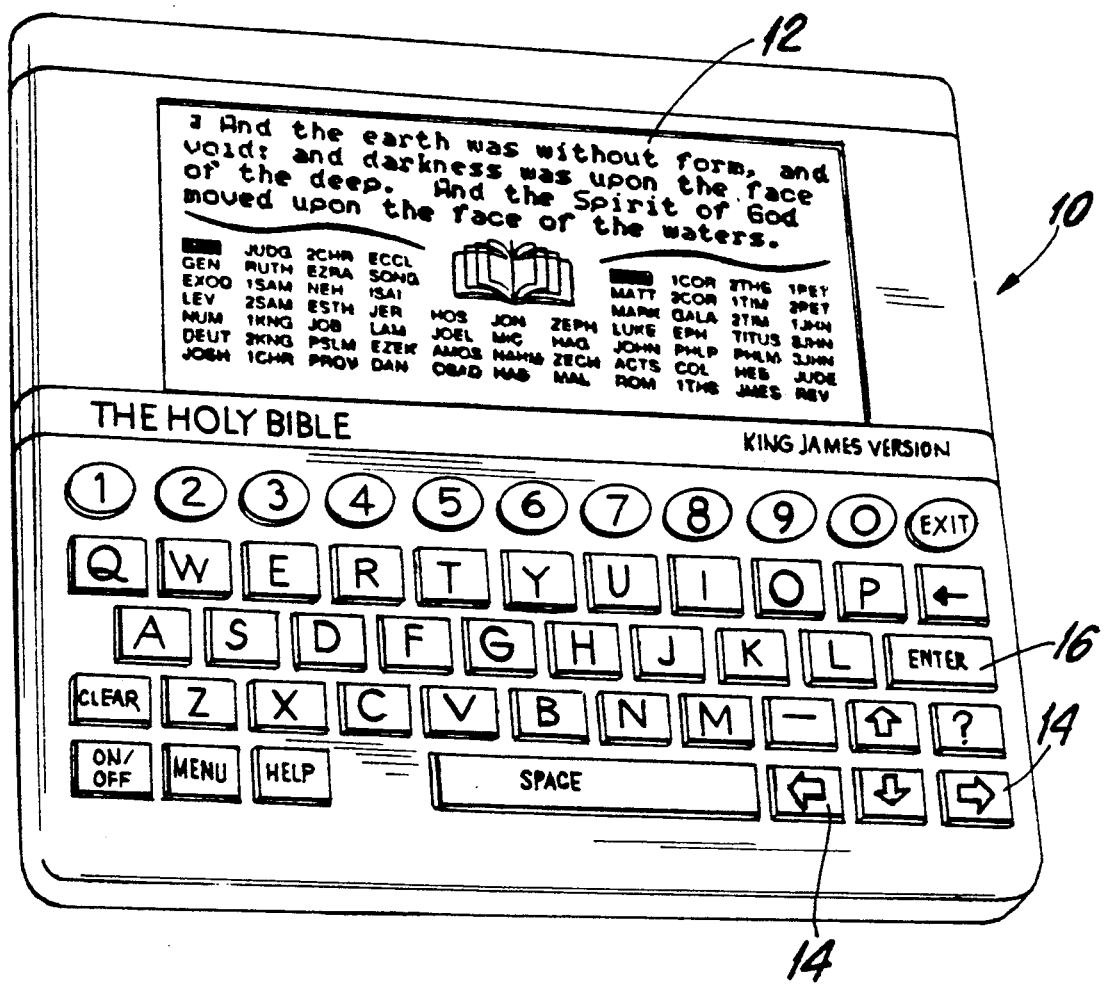
FIG. 1 is a perspective view of a device embodying the text compression improvement of this invention.

FIG. 1 illustrates the face of a portable, hand held machine 10 having a keyboard to permit a user to manually enter data and a display 12. The keys on the keyboard include alpha-numeric keys as well as four scroll keys 14. There is an ENTER key 16 which performs the usual ENTER function and has to be pressed in order to cause a search word or text locating designation that is put on the screen 12 by the user to be entered into the electronic processing of the machine 10. This key, like the rest of the keys on the keyboard, perform standard functions and thus need not be described in greater detail herein. Certain of the keys will be referred to during the course of this description simply to facilitate reference.

It might be noted that the display can be either the portion of text located during search or can be, as in the case of the embodiment that has been manufactured, a display of the names of the books of the Bible in which the term searched may be found. In this latter case, the user can select the book or books of interest to facilitate search. The various scroll keys are useful for selecting the particular book whose title is displayed to be searched. But all of that is incidental to the text storage and compression techniques involved in this invention.

Three embodiments are shown in FIGS. 2, 3 and 4. The second and third embodiments are preferred because they involve greater compression and greater speed during search and reading. However, the basic concept of this invention may best be understood with respect to the first embodiment shown in FIG. 2. It should be recognized that it would not be meaningful or efficient to store the small size text shown in the FIG. 2 example of the technique of this invention. The FIG. 2 embodiment is to illustrate the technique of this invention.

The text shown in FIG. 2 employs words and punctuation symbols. Both, of course, have to be encoded. Each term (word and symbol) is encoded in a lexicon-file. Each term is located in the lexicon-file by, for example, a row number. Each term in the lexicon-file has associated with it a linking signal that identifies the location in the text where that term first appears. This linking signal is the number under the "Text Location" column in FIG. 2. This signal provides a link between the entry in the lexicon-file and one entry in the text-file for the corresponding word. For example "peppers" happens to be on the sixth row of the lexicon-file and appears in the text the first time as the eighth word of the text. Thus the linking signal in the lexicon-file for "peppers" is the number "8" which refers to the eighth word of the text.

The text-file is a series of numbers all of which are referred to herein as linking signals. The last occurrence of a lexicon word in the text is represented in the text file by a linking signal which refers to the row of a lexicon-file where that term appears. Again, using "peppers" as an example, the last occurrence of "peppers" in the text is represented by the linking signal "minus 6" in the text file indicating that the word "peppers" will be found in the sixth row of the lexicon-file. For convenience of representation these linking signals which link the last occurrence in the text of a lexicon term to the lexicon-file are indicated as negative numbers. This contrasts with the other linking signals in the text-file which are indicated as positive numbers. Those linking numbers in the text-file refer to the next occurrence of that lexicon word in the text. For example, "peppers" first appears as the eighth word in the text. The eighth entry in the text-file is the linking number "11". This means that the next occurrence of "peppers" is 11 terms further on in the text. This second occurrence is represented by the linking signal "5" which means that the next (i.e. third) occurrence of the word "peppers" is five terms further on in the text. It must be remembered that punctuation marks are terms.

Then the entry marked "minus 6" that refers back to the sixth row of the lexicon-file where the word "peppers" is encoded. At the lexicon-file the linking signal "8" refers to the entry location in the text-file where the word "peppers" first occurs.

Thus the linking signals in the lexicon-file and the entries in the text-file which function as linking signals serve to link together all entries for the same lexicon word.

In this fashion, a term has to be encoded only once, in the lexicon-file, and all other occurrences of the term in the text are represented by linking signals. Thus, an entry in the text-file does not have to include the encoding of the term. That is because the linking signals in the text-file enable a search for all entries that represent the word involved.

In a search mode, a word that is being searched is entered into the device shown in FIG. 1, first by indicating the word with the letter keys involved, then pressing the ENTER key and a search function of a type known in this art is undertaken. However, the search is of the lexicon-file. The word is located in the lexicon-file. For example, if the input word is "peppers" the lexicon-file is searched to find the word "peppers" which then causes the machine to go to the eighth text-file entry and follow the linking signals back to the lexicon-file.

At each text-file stop, the location can be read into an appropriate temporary memory for display after the search routine is completed. However, in one embodiment of this invention which has been implemented, the text at each location is displayed as the location is found on the search. That location is held in memory and when the user is through with reviewing that location, the user initiates an input (such as pressing the "N" key) to cause the machine to move ahead to the next incidence of that lexicon word. The next incidence of that lexicon word is located by the entry at the place where the reading has just occurred and thus the next incidence of the lexicon word can be immediately located without having to go through the complete search linking routine back to the lexicon-file.

For reading purposes, once a user has located a point in the text where the user wishes to read (often after a search routine) the device proceeds in the usual fashion of reading one text-file entry at a time. But, in order to display the lexicon word that corresponds with each text-file entry, the device has to go through the entire linking procedure back to the lexicon-file where the word is then decoded and presented on the screen. This reading technique is, of course, somewhat slower than would be the direct reading of each lexicon word if it were directly encoded into the text-file. But, the microchips on which this material is encoded can process this linking procedure so much more quickly than any individual can read that there is no loss of reading facility. That immaterial loss in reading display time gains the advantage of a much more compressed text encoding.

In the reading mode, a standard index technique is used to locate the appropriate starting place in the text-file.

For example, if the user types in JOHN 3 16, then presses the ENTER key, the device employs a standard type of index to locate JOHN 3 16, which index entry indicates the text file entry where JOHN 3 16 starts. The device then accesses that point in the text file and starts to read in the fashion described above by going through the linking number system.

Although the FIG. 2 embodiment has been described in terms of the position of the words and symbols that are encoded in the text-file, it must be appreciated that these terms are encoded as bytes of codes. Some numerical entries will require more bytes and some fewer bytes. The linking signal numerical entry itself is in terms of bytes rather than in terms of words. Similarly the text location linking signal is in terms of bytes into the text rather than words into the text for the first occurrence of the term involved.

Because certain words and most grammatical symbols are not to be searched, there is no need to include those words and terms in the lexicon-file. Accordingly, as shown in the second embodiment in FIG. 3, the lexicon words are limited to the significant words of the text and in particular those words which it might be desired to search. For the particular text shown in FIG. 2, the eighteen terms are reduced to seven lexicon words. The text-file, therefore, contains linking signals only for these seven lexicon words. The other words and punctuation marks are directly encoded. Thus it is appropriate to say that lexicon words are encoded by linking signals and non-lexicon terms are directly encoded.

FIG. 4 shows a third embodiment similar to the second embodiment. Only the seven significant search words are deemed to be lexicon words and thus only those seven words are in the lexicon file. However, the text-file is divided in two separate files. One is a master-subfile and the other a search-subfile. The search-subfile is limited to only the lexicon words. There are no entries in the search-subfile for any of the non-lexicon words. This reduces the size of the search-subfile appreciably over the text-file shown in the first and second embodiment and speeds up the search routine.

A master-subfile is employed in which a place holder, as shown by an asterisk in FIG. 4, is entered for each lexicon word. The non-lexicon terms (words and symbols) are directly encoded.

For reading purposes, the master-subfile is employed and each asterisk has to be correlated to a corresponding search-subfile text entry for which the linking signal routine is followed so as to provide the appropriate word from the lexicon-file.

This is achieved by synchronizing the two sub-files and advancing the search-subfile by one entry each time the master-subfile advances by one place holding entry.

It might be noted in this FIG. 4 third embodiment that this search-subfile because it is limited to the lexicon words has many fewer entries than the text-file of the first and second embodiment. Accordingly, the linking numbers in this search-file are smaller than the linking numbers in the text-files of the other embodiments because there are fewer entries until the next entry of the lexicon word. Similarly, the linking numbers under the column "Text Location" in the lexicon-file are generally different than the ones in the other embodiments because these refer to text locations in the search-subfile.

It is presently believed that the tradeoffs in the FIG. 3 and FIG. 4 embodiments are such that they provide comparable results. The degree of compression that can be obtained is highly data dependent. It would be difficult if not impossible ahead of time to determine for a given text which of the two techniques would provide greater compression. One would have to balance off the efficiency of using smaller linking numbers for the search-subfile in the FIG. 4 embodiment against the inefficiency of having to encode the place holders for the master-subfile.

These linking signals can be considered as three types of linking signals in terms of the function they perform. The first type of linking signal is the one that is normally connected with the last entry of a lexicon word in the text-file and that identifies the corresponding lexicon word in the lexicon-file.

Whether the FIG. 3 or FIG. 4 embodiment would be preferred in a particular application depends upon the functional factors desired. The third embodiment may provide faster searching than in the second embodiment but might provide somewhat slower reading. That would depend upon the particular encoding techniques employed. Another consideration as to whether the second or third embodiment is selected is the relative number of lexicon words and non-lexicon terms.

These linking signals can be considered as three types of linking signals in terms of the function they perform. The first type of linking signal is the one that is normally connected with the last entry of a lexicon word in a text-file and that identifies the corresponding lexicon word in the lexicon-file.

The second type of linking signal is normally associated with all but the last entry of a lexicon word in the text-file so as to indicate the location in the text-file of the next occurrence of an entry that stands for the same lexicon word.

The third type of linking signal is in the lexicon-file and normally identifies the first entry in the text-file that stands for the text word that is the same as the lexicon word.

Thus it is the first and second type of linking signals which together are the entries in the text-file corresponding to each text word that is a lexicon word.

Yet, it is the second and third types of linking signals which together constitute a set of linking signals that identify entries in the text-file.

Thus, briefly the first and second type of linking signals constitute the set of entries that are in the text-file and the second and third types of linking signals constitute a set that locate corresponding entries in the text-file.

Thus it can be seen that the second type of linking signal serves as both an entry in the text-file and as a identification of a different entry in the text-file.

Figure 5:
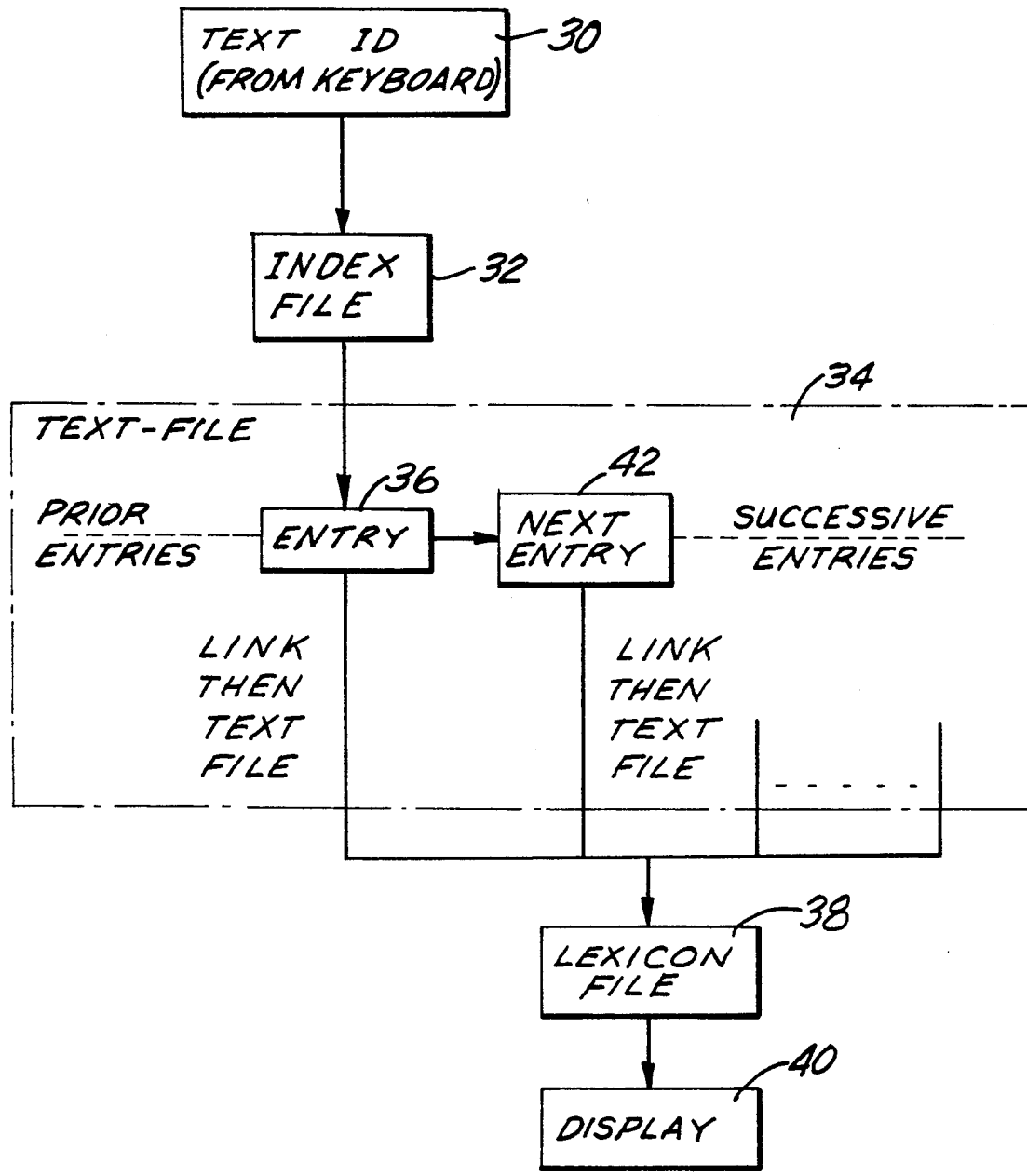
FIGS. 5 and 6 are diagrammatic representations of the logical relationship between the text-file and lexicon-file during the read and search modes.
Figure 6:
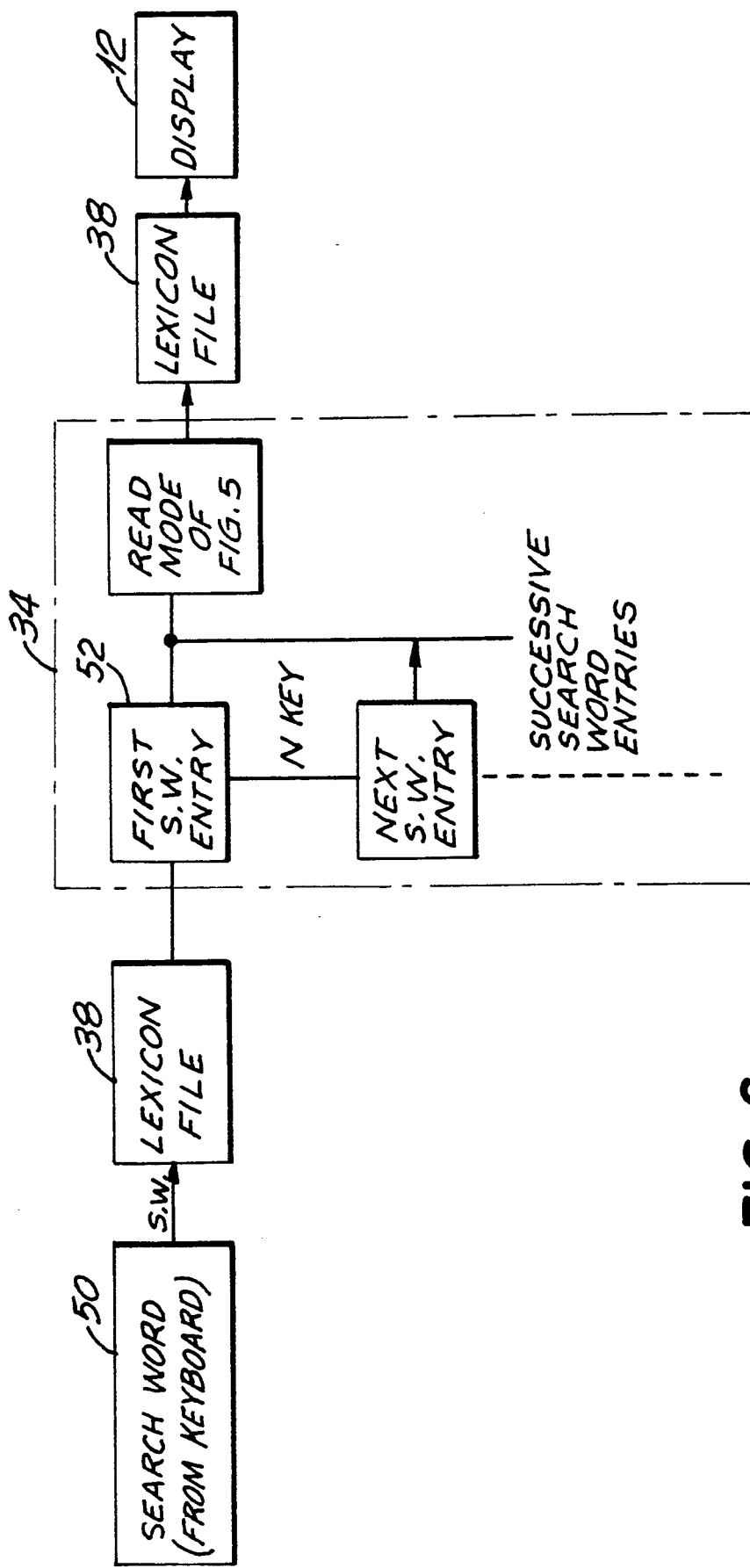

FIGS. 5 and 6 are high level diagrammatic representations of the relationships between the files and the steps taken during the read and search modes.

FIG. 5 illustrates the read mode. The read mode is opened by typing a text identification term 30, such as JOHN 3 16, into the keyboard and then pressing the ENTER key. The locating term so entered is applied to index file 32 which identifies and locates the specific text-file 34 entry 36 that begins the text identified by the term 30. This text-file entry 36 is, as described above, a numeral (specifically, the second type of linking signal) that links through to the next text-file entry standing for the same word.

The device 10 then links through the text-file 34 to the last entry of that particular word, which then links through to the lexicon-file 38 to provide the word on the display 12. The machine automatically advances to the very next entry 42 in the text-file which then again links through the text-file 34 for that lexicon word until a linking signal pointing to the lexicon-file 38 is found so that the lexicon-file 38 can provide the word for the display 12. This continues on through successive entries in the text-file 34 to fill up the screen.

In this read mode, successive text can be displayed by having the operator press the scroll keys 14.

With the FIG. 5 reading mode in mind, the search mode schematically shown in FIG. 6 can best be understood.

In the search mode, a search word (S.W.) 50 is provided by the user from the keyboard. The search word 50 is applied directly to the lexicon-file 38 in order to be matched against the corresponding lexicon word in the file 38. The lexicon word in the file 38 then provides a linking signal (the third type of linking signal) that identifies the first entry 52 in the text-file 36 which stands for that search/lexicon word.

In one presently preferred embodiment, the device then goes through the read mode discussed in connection with FIG. 5 so as to provide at the display 12 the text associated with that first incidence of the search/lexicon word. The read mode is the operation downstream of the index file 32 in FIG. 5.

The user can then advance through the text-file to each successive entry standing for the search/lexicon word by pressing the N key on the keyboard. Each time the N key is pressed during the search mode, the second type of linking signal (which is the numeral at the text-file entry) identifies the succeeding text-file entry that stands for the search/lexicon word involved. Location of that next entry automatically causes the read mode of FIG. 5 to be processed so that the text associated with that next entry will be seen on display 12.

Successive entries of the same search word can be accessed by the operator pressing the N key successively thereby displaying the text associated with each successive instance of the search word.

In most extensive texts, there will be certain significant search words which have to be lexicon words that will recur with considerable frequency. For example, in the Bible the words Lord and God appear very often. For such lexicon words, it is of some value to avoid linking through the entire text when in the reading mode.

Accordingly, a fourth type of linking signal is employed which is operative only in the reading mode and is not employed in the search mode. This fourth type of linking signal performs the same function as the first type of linking signal in that it identifies the corresponding word in the lexicon-file. But since it is used only in the reading mode, it is in addition to the second type of linking signal for the text-file entry involved. Since this fourth type of linking signal does occupy memory space, it is important that it be employed infrequently. Considering the speed with which the linking process occurs, it might make sense to use this fourth type of linking signal once in every one-thousand incidences of the particular lexicon word involved. For example, in the Bible, it would be employed in connection with one in every thousand entries for the word God. This fourth type of linking signal does perform the same function as the first type of linking signal in that it identifies the row in the lexicon-file which has the associated lexicon word. It should be kept in mind, however, that each text-file entry which has this fourth type of linking signal also has the second type of linking signal so that the entry involved can be employed in connection with the search mode.

In one application of the invention, it becomes possible to simultaneously search for two or more lexicon words where they occur within a predetermined text distance of one another. The machine simply independently searches through the linking signals for each incidence of, for example, two separate lexicon words. The incidences of one lexicon word are compared to the incidences of the second lexicon word in terms of location in the text-file. Where these comparisons show that the distance is below a predetermined or preset threshold, then the two entries, one corresponding to the first lexicon word and the other to the second lexicon word, are set in storage for identification and display.

In order for this search for two or more lexicon words that occur within a predetermined text distance of one another to be effective, it is necessary that the sequence of entries in the text-file correspond to the sequence of terms in the text. This ordering of the text-file to correspond to the text is important for the read mode in any case. However, the lexicon-file need not be ordered in any particular fashion. And indeed, in the examples shown in FIGS. 2, 3 and 4, the entries in the lexicon-file are purposely shown as not being ordered in the same sequence that they appear in the text in order to emphasize that the lexicon-file is simply a set of lexicon terms.

It is often useful to make a search in which variations on a term are considered the equivalent of the term. A known type of limited thesaurus function can be used to identify all such variations of the term. For example, if the entry word is "meek" the thesaurus function can either automatically (or on request of the user) cause the search to be for both the words "meek" and "meekest". Similarly, if the second word being entered is "earth" the thesaurus function can identify the variations on it which include words such as "earth" and "earthy". Although the linking signal thread for each version of the entry word remains separate, the entries identified by linking through for each version of the first word can be merged for purposes of comparison with the merged entries of each variation of the second word involved. Thus, the entries being compared are (a) the entries for all versions of the first word entered and (b) the entries for all versions of the second word being searched.

A more extensive set of words corresponding to each entry word can be obtained by the use of a known type of thesaurus function. Again each link for each member of the first set is merged for comparison with each link of each member of the second set.

This merger of entries found on syntactical or thesaurus variations of an entered word are useful to enhance the utility of a device which embodies this invention but is not necessary to nor a part of this invention.

This invention is in the text storage technique described above which involves the use of the lexicon-file and the linking signals that permit not having to directly encode lexicon words into the text-file. Any product in which this invention is incorporated will require additional software in order to provide display and to provide efficient encoding of the contents of the lexicon-file and the text-file. There are many techniques known in the art to effect such results and known techniques can be employed in connection with this invention. Accordingly, a description of these known techniques need not be undertaken here.

However, there is attached hereto as Appendix A, a microfiche listing of a product which includes, among other things, a presently preferred embodiment of this invention. The listing also includes embodiments of associated software to perform functions such as display functions, enter functions, user interface functions and encoding techniques for words and numbers which are not part of this invention. It should be kept in mind that this invention can be employed with any technique for performing those functions. The Appendix A listing is primarily in C code with a small amount of Assembly code.

In Appendix A, the 92 page Primary Compression Method Listing is the code for the compression technique. It does not reside in the FIG. 1 product. It is used in manufacture to provide the compressed files which reside in the FIG. 1 product. In Appendix A, the 200 plus page Program Listing does reside in the FIG. 1 product and includes the user interface programs.

It should be understood that although certain embodiments of the invention have been described, there are variations which are encompassed within the scope of the claims and which would be understood by one skilled in this art. For example, although the first type of linking signal is the last entry of a lexicon word in the text-file and the third type of linking signal identifies the first entry of a lexicon word in the text-file the arrangement could be such that these two types of linking signals would be associated with something other than the first and last lexicon word entries. After all, if the text is considered to be a loop, there need be no particularly unique first and last point in that loop.

What is claimed is:

1. The method of storing a text in an electronic memory to permit reading and searching of the text, wherein the text has a plurality of search words, comprising the steps of:
  establishing a lexicon-file in memory, all incidences of a search word in the text being represented by a single lexicon-word entry in said lexicon-file,
  establishing a text-file in memory, each term in the text being represented by an entry in said text-file,
  ordering those of said entries which represent incidences of search words in said text-file in a manner that corresponds to the ordering of said search words in the text, providing first and second types of linking signals to represent incidences of each search word in said text-file, providing said first type of linking signal for at least one location of each search word in said text-file, said first type of linking signal locating the corresponding word in said lexicon-file, providing said second type of linking signal for the rest of the locations of the same search word in said text-file, said second type of linking signal locating another occurrence in said text-file of an entry that stands for the same search word, and providing a third type of linking signal for each lexicon-word in said lexicon-file to indicate the location of an entry in said text-file standing for a text-word that is the same as said lexicon-word.

2. The method of claim 1 wherein:

said first type of linking signal is the last entry in said text-file of the search word involved, and said third type of linking signal in said lexicon-file identifies the first entry in said text-file of the search word involved.

3. The method of claim 2 further comprising the step of: in said text-file, including entries representing non-search words and symbols.

4. The method of claim 2 further comprising:

dividing said text-file into a master-file and a search-file, in said search-file, including only entries corresponding to search words in the text, in said master-file, including a place holder entry for each search word in the text and a directly encoded entry for non-search words and symbols.

5. The method of claim 4 further comprising the steps of:

searching for incidences of two different search words, and identifying only incidences where said two words searched are within a predetermined text-file distance of one another.

6. The method of claim 2 further comprising the steps of:

searching for incidences of two different search words, and identifying only incidences where said two words searched are within a predetermined text-file distance of one another.

7. The method of claim 1 further comprising the step of: in said text-file, including entries representing non-search words and symbols.

8. The method of claim 1 further comprising:

dividing said text-file into a master-file and a search-file, in said search-file, including only entries corresponding to search words in the text, in said master-file, including a place holder entry for each search word in the text and a directly encoded entry for non-search words and symbols.

9. The method of claim 1 further comprising the steps of:

searching for incidences of two different search words, and identifying only incidences where said two words searched are within a predetermined text-file distance of one another.

10. The method of claim 1 further comprising the steps of:

providing a fourth type of linking signal in said text-file for multiple entries of the same search word, said fourth type of linking signal locating the corresponding word in the lexicon-file, in reading mode, said fourth type of linking signal providing link back to said lexicon-file prior to completion of linking through said text-file, each text-file entry having said fourth type of linking signal also having said second type of linking signal.

11. The method of claim 10 wherein:

said first type of linking signal is the last entry in said text-file of the search word involved, and said third type of linking signal in said lexicon-file identifies the first entry in said text-file of the search word involved.

12. The method of claim 11 further comprising:

dividing said text-file into a master-file and a search-file, in said search-file, including only entries corresponding to search words in the text, in said master-file, including a place holder entry for each search word in the text and a directly encoded entry for non-search words and symbols.

13. The method of claim 12 further comprising the steps of:

searching for incidences of two different search words, and identifying only incidences where said two words searched are within a predetermined text-file distance of one another.

14. The method of claim 10 further comprising:

dividing said text-file into a master-file and a search-file, in said search-file, including only entries corresponding to search words in the text, in said master-file, including a place holder entry for each search word in the text and a directly encoded entry for non-search words and symbols.

15. The method of claim 10 further comprising the steps of:

searching for incidences of two different search words, and identifying only incidences where said two words searched are within a predetermined text-file distance of one another.

16. In an electronic text that permits reading and searching of the text wherein the text has a plurality of search words, the compression improvement comprising:

a lexicon-file in memory in which there is a single lexicon-word entry representing all incidences of a search word in the text, a text file in memory in which each term in the text is represented by an entry, said entries for the incidence of each search word in said text-file being ordered in a manner corresponding to the ordering of the search words in the text, said entries for the incidence of each search word in said text-file including:

(a) a first type of linking signal for at least one location of a search word in said text-file to indicate the location of the corresponding word in said lexicon file, and (b) a second type of linking signal for the rest of the locations of the same search word in said text-file to indicate the location in said text-file of another occurrence of an entry that stands for the same search word, a third type of linking signal for each lexicon-word in said lexicon-file to indicate the location of an entry in said text-file standing for a text word that is the same as said lexicon-word.

17. The improvement of claim 16 wherein:

said first type of linking signal is the last entry in said text-file of the search word involved, and said third type of linking signal in said lexicon-file indicates the first entry in said text-file of the search word involved.

18. The improvement of claim 17 wherein said text-file entries includes non-search words and symbols.

19. The improvement of claim 17 further comprising:

said text-file having a master-file and a search file, said search-file having only entries corresponding to search words in the text, said master-file having a place holder entry for each search word in the text and a directly encoded entry for non-search words and symbols.

20. The improvement of claim 16 wherein said text-file entries includes non-search words and symbols.

21. The improvement of claim 16 further comprising:

said text-file having a master-file and a search file, said search-file having only entries corresponding to search words in the text, said master-file having a place holder entry for each search word in the text and a directly encoded entry for non-search words and symbols.

22. The improvement of claim 16 further comprising:

a fourth type of linking signal in said text-file for multiple entries of the same search word to locate the corresponding word in the lexicon-file, in reading mode, said fourth type of linking signal provides link back to said lexicon-file prior to completion of linking through said text-file, each text-file entry having said fourth type of linking signal also having said second type of linking signal.

23. The improvement of claim 22 further comprising:

said text-file having a master-file and a search file, said search-file having only entries corresponding to search words in the text, said master-file having a place holder entry for each search word in the text and a directly encoded entry for non-search words and symbols.

24. The improvement of claim 22 wherein:

said first type of linking signal is the last entry in said text-file of the search word involved, and said third type of linking signal in said lexicon-file indicates the first entry in said text-file of the search word involved.

25. The improvement of claim 24 further comprising:

said text-file having a master-file and a search file, said search-file having only entries corresponding to search words in the text, said master-file having a place holder entry for each search word in the text and a directly encoded entry for non-search words and symbols.

* * * * *